United States Patent [19]

Yokogawa et al.

[11] Patent Number: 5,600,626

[45] Date of Patent: Feb. 4, 1997

[54] OPTICAL DISK OF SAMPLED SERVO TYPE HAVING SYNCHRONIZATION A MARKS FOR SIMPLE SYNCHRONIZATION DETECTION

[75] Inventors: Fumihiko Yokogawa; Yoshimi Tomita; Hideki Hayashi, all of Tsurugashima, Japan

[73] Assignee: Pioneer Electronic Corporation, Tokyo, Japan

[21] Appl. No.: 343,946

[22] Filed: Nov. 17, 1994

[30] Foreign Application Priority Data

Nov. 19, 1993 [JP] Japan ..................................... 5-290750

[51] Int. Cl.⁶ ........................................................ G11B 7/00
[52] U.S. Cl. ................................... 369/275.3; 369/275.4; 369/44.26
[58] Field of Search ............................. 369/275.1, 275.3, 369/275.4, 44.26, 44.34

[56] References Cited

U.S. PATENT DOCUMENTS 4,748,609  5/1988  Yonezawa ............................. 369/275.3
5,199,023  3/1993  Yamamoto ........................... 369/275.4
5,404,345  4/1995  Taki ....................................... 369/44.26
5,406,545  4/1995  Kadowaki ............................. 369/275.3

*Primary Examiner*—David C. Nelms
*Assistant Examiner*—Son Mai
*Attorney, Agent, or Firm*—Sughrue, Mion, Zinn, Macpeak & Seas

[57] ABSTRACT

An optical disk with tracks having a sampled servo type recording format, and comprising a preformatted servo field including a synchronous mark for synchronization detection and a data field for recording data on each track. In the optical disk, the synchronous marks are aligned in the same radial direction of the disk per track and have the edge interval longer than the maximum inversion interval of the mark for the data in the track direction, and the interval of the synchronous mark between the adjacent tracks is made smaller than the spot diameter of a reading beam. Hence, in the radial direction of the disk where the synchronous marks are present, the synchronous mark is included in the spot of the reading beam of a pickup irrespective of being on-track or off-track to make it possible to obtain substantially the same level for synchronous signals.

1 Claim, 3 Drawing Sheets

OPTICAL DISK OF SAMPLED SERVO TYPE HAVING SYNCHRONIZATION A MARKS FOR SIMPLE SYNCHRONIZATION DETECTION

BACKGROUND OF THE INVENTION

1. Field of the Invention

This invention relates to an optical disk having a recording format for a sampled servo system.

2. Description of the Related Background Art

In an optical disk having a recording format for a sampled servo system, a synchronous pattern provided with two marks (pits) is formed on the track in order to obtain a synchronizing signal for reading recorded data. The distance between the two marks is made longer than the maximum inversion interval which is the maximum distance between the marks in the marked portion indicating the data.

The RF signal read by a pickup and output from an optical disk are supplied to a differentiator to obtain the synchronizing signal from the synchronous pattern. A zero-cross point of signal output from the differentiator is detected. The synchronizing signal is thus detected from the zero-cross point. Besides the constitution of detecting the synchronizing signal, an arrangement is made to supply the output read by the pickup to an A/D converter, and to use it for the reproduction of the recorded data on the disk after having digitized it.

However, since the reproduction of recorded data is timed by generating a clock pulse on the basis of the detected synchronizing signal, a problem is inevitably encountered that if the systems for detecting the synchronizing signal and the system for reproducing the data are arranged separately from the output signal of the pickup as described above, each operational timing of the respective systems should be adjusted because the degree of delay in the respective systems differ from each other.

SUMMARY OF THE INVENTION

Therefore, it is an object of the present invention to provide an optical disk capable of detecting a synchronizing signal without any adjustment of operational timing of the systems for detecting the synchronizing signal and reproducing the data.

An optical disk according to the present invention has a sampled servo type recording format and comprises a preformatted servo field including a synchronous mark for synchronization detection and a data field for recording data on each track. In the optical disk, the synchronous marks are aligned per track in the same radial direction of a disk, the edge interval which is longer than the maximum inversion interval of marks for data is provided in the direction of the track, and then, the interval of the synchronous marks between the adjacent tracks is made smaller than the spot diameter of a reading beam.

According to the optical disk of the invention, the synchronous mark is included in the spot of reading beam of a pickup irrespective of being on-track or off-track in the radial direction of the disk where the synchronous marks are present, hence making it possible to obtain substantially the same reading level for synchronizing signals.

DETAILED DESCRIPTION OF THE PREFERRED EMBODIMENT

Hereinafter, an embodiment of the present invention is described below with reference to the accompanying drawings.

Figure 1:
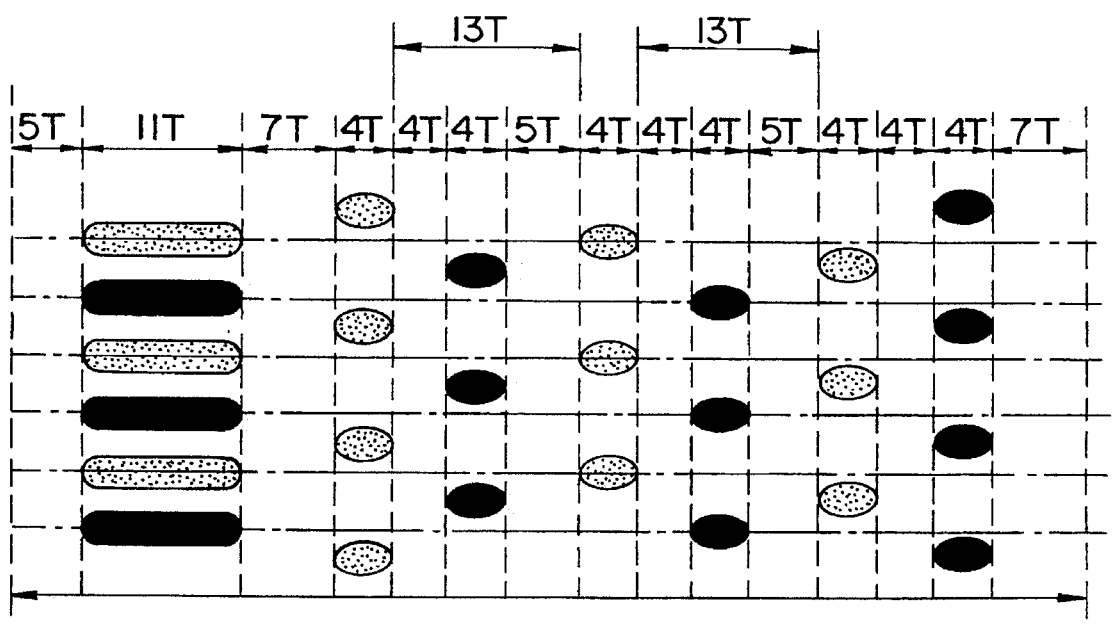
FIG. 1 is a view showing a servo field of an optical disk according to the present invention.

FIG. 1 shows the pits (marks) formed in a servo field of an optical disk of a CAV (Constant Angular Velocity) type for double density recording as an embodiment according to the invention. In the disk, the servo field is formed as pre-pits per segment of each track. In FIG. 1, the tracks are formed at intervals of 0.4 µm, for example. On the head of segments in each track, a synchronous pit having a length of 11T (T being one pit interval) is arranged. Following this, a plurality of pits are formed to perform tracking servo control. The synchronous pit on each track is positioned in the same radial direction of the disk. The synchronous pit width is 0.2 µm, for example. On the odd-numbered track, a first tracking pit having a length of 4T is positioned as a wobble pit apart from the rear edge of the synchronous pit by 15T on the left side to the center of the track in the direction toward the terminal of the segment as indicated by a painted ellipse in FIG. 1. Then, a clock pit having a length of 4T is positioned on the track separated from the rear edge of the first tracking pit by 13T. Further, a second tracking pit having a length of 4T is positioned as a wobble pit separated from the rear edge of the track pit by 13T on the right side to the center of the track in the direction toward the terminal of the segment. On the even-numbered track, a first tracking pit having a length of 4T is positioned as a wobble pit apart from the rear edge of the synchronous pit by 7T on the left side to the center of the track in the direction toward the terminal of the segment as indicated by a shaded ellipse in FIG. 1. Then, a clock pit having a length of 4T is positioned on the track separated from the rear edge of the first tracking pit by 13T. Further, a second tracking pit having a length of 4T is positioned as a wobble pit separated from the rear edge of the clock pit by 13T on the right side to the center of the track in the direction toward the terminal of the segment. Each wobble pit is formed around a point away from the center of the track by 0.2 µm, for example. The data field (not shown) is similarly positioned.

Figure 2:
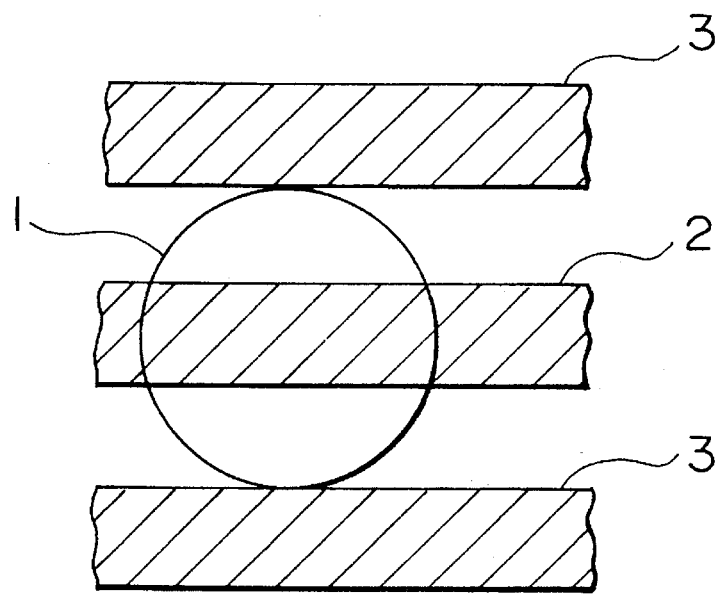
FIG. 2 is a view showing the relationship between the diameter of an irradiated spot and synchronous pit intervals.

In order to read the recorded information from an optical disk having a servo field, the spot diameter of a light beam to be irradiated from the pickup is 0.66 µm where the wavelength λ to be used is 442 nm and the aperture number NA is 0.55. If the track pitch is set at 0.4 µm as described above, the pitch is equal to or smaller than the spot diameter, and less than the diffraction limit. As a result, in the case of the on-track position where the irradiated spot 1 is positioned at the center of a pit 2 in any one of the tracks as shown in FIG. 2, the irradiated spot is in a state that it contacts part of a pit 3 on the adjacent track. Even when the irradiated spot is in an off-track position where it is positioned at the center between the adjacent tracks, the reading level by the pickup can be significant. This means that even in a case of off-track, the synchronous pit can be detected.

Figure 3:
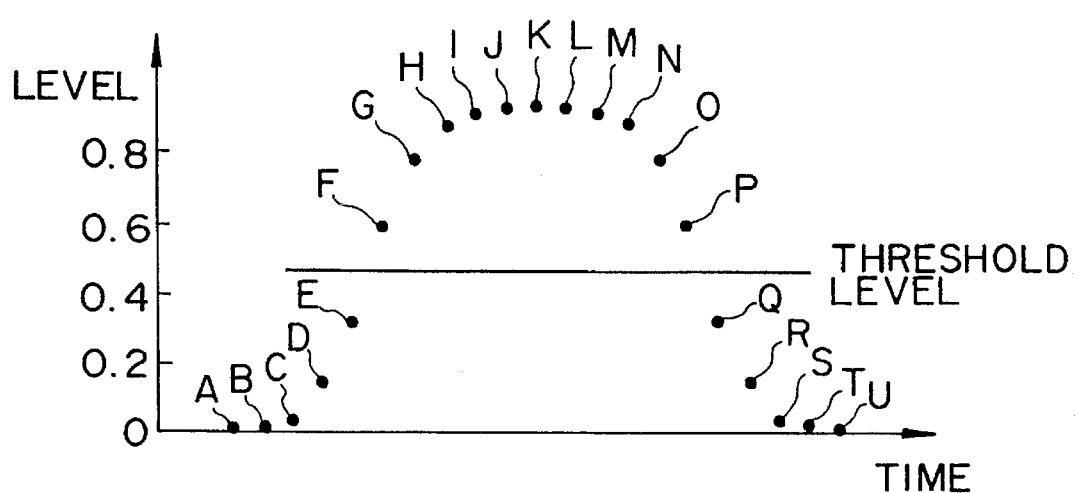
FIG. 3 is a view showing reading levels of a synchronous pit per clock pulse at the time of on-track.

FIG. 3 shows the reading levels of the synchronous pit having a length of 11T at the time of on-track per clock pulse. In FIG. 3, if a threshold level is set at half a peak value of the reading level, the threshold level is 0.4595. It is assumed that if the reading level is equal to or more than 0.4595, the reading level is a level read at the pit portion. In FIG. 3, the reading points F to P indicate the pit portion, that is, these are received as the synchronous pit. The first reading point F in the reading points F to P has a level of 0.5836. The limit of the fluctuation of amplitude with respect to the reading point F is 0.4595÷0.5836×100=78.7%.

For example, assuming that the track pitch is 0.44 μm, increased from 0.4 μm by 10%, the off-track level/on-track level is carried out with respect to the pit length 11T (1.2931 μm) and represented in percentage as 94.1% when the pit width is 0.15 μm; 96.61% when the pit width is 0.2 μm; and 99.1% when the pit width is 0.25 μm. Therefore, in view of the limit of the fluctuation amplitude with respect to the reading point F, it is clear that the reading level is not fluctuated greatly, and the synchronous pit can be detected in either case of the irradiated spot being off-track or on-track.

Figure 4:
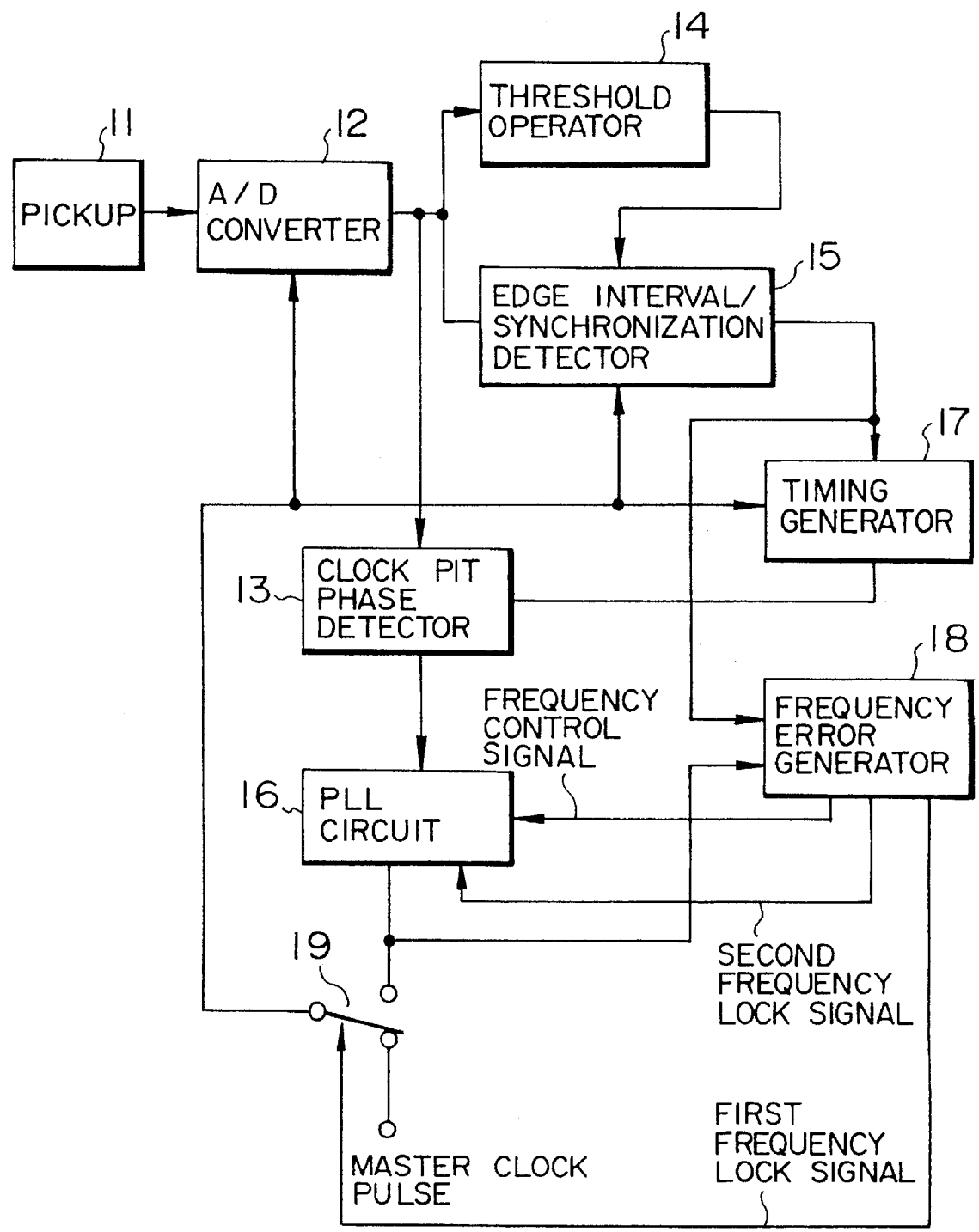
FIG. 4 is a block diagram showing a clock pulse generator.

FIG. 4 shows a clock pulse generator for generating clock pulses from the reading signal of the optical disk having the servo field shown in FIG. 1. In the clock pulse generator, the light beam is irradiated from the pickup 11 to the disk for reading information. The RF signal, that is, the signal read from the disk by the pickup 11 is supplied to an A/D converter 12. After being converted into a digital RF signal by the A/D converter 12, the RF signal is supplied to a clock pit phase detector 13, threshold operator 14, and edge interval/synchronization detector 15. The clock pit phase detector 13 obtains a phase error signal which indicates the difference in the sample values before and after the clock pit wave form from the digital RF signal in accordance with a clock sampling signal. To the clock pit phase detector 13, a PLL circuit 16 is connected. The PLL circuit 16 generates reproduction clock pulses and supplies them to a change-over switch 19, and controls the phase or frequency of the reproduction clock pulses in accordance with a frequency control signal which is described later. The change-over switch 19 selectively outputs the reproduction clock pulses output from the PLL circuit 16 and asynchronous master clock pulses in accordance with a first frequency lock signal to be described later. The master clock pulses are generated by a pulse generator (not shown). The clock pluses selectively output from the change-over switch 19 are supplied to the A/D converter 12, the edge interval/synchronization detector 15, and a timing generator 17.

The threshold calculator 14 detects positive and negative peak levels of the digital RF signal per given cycle, and calculates an intermediate value of the positive and negative levels as a threshold level. When the digital RF signal that exceeds the threshold level is detected, the edge interval/synchronizing detector 15 obtains the period of time exceeded such level by counting the clock pulses from the change-over switch 19, and then, generates a synchronous detection signal indicative of detection of a synchronous pit if the counted value of the clock pulses is more than a first predetermined value.

To the edge interval/synchronizing detector 15, the timing generator 17 and the frequency error generator 18 are connected. The timing generator 17 counts the clock pulses from the change-over switch 19 on the basis of the time at which the synchronous detection signal is generated, and generates the above-mentioned clock sampling signal in order to supply the clock sampling signal to the clock pit phase detector 13. The frequency error generator 18 obtains the interval between the synchronous signals by counting the reproduction clock pulses from the PLL circuit 16 in response to the detection synchronous signal, and then, compares the counted value of the reproduction clock pulses with a second predetermined value, thereby generating the frequency control signal in accordance with the result of the comparison. The frequency control signal is supplied to the PLL circuit 16. The frequency of the reproduction clock pulses is controlled in accordance with the frequency control signal. Also, the frequency error generator 18 generates a first frequency lock signal when the frequency of the reproduction clock pulses enters the first predetermined range, and generates a second frequency lock signal if the frequency enters a second predetermined range which is narrower than the first predetermined range. The first frequency lock signal is supplied to the change-over switch 19, and the second frequency lock signal is supplied to the PLL circuit 16.

In the clock pulse generator with such constitution, the change-over switch 19 selectively outputs the master clock pulses in the initial state. Thus, the A/D converter 12 obtains the sample value from the RF signal read from the disk by the pickup 11 in response to the master clock pulses and digitizes it. The intermediate value of the positive and negative peak levels of the digital RF signal is calculated by the threshold calculator 14 as a threshold level. When the digital RF signal which exceeds such threshold level is detected, the period of time for the RF signal exceeded it is obtained by the edge interval/synchronizing detector 15 by counting the master clock pulses accordingly.

The edge interval/synchronizing detector 15 generates the synchronous detection signal if the counted value of the master clock pulse is more than the first predetermined value. On the basis of the time at which the synchronizing detection signal is generated, the timing generator 17 counts the master clock pulses and generates the clock sampling signal which indicates the time at which the clock pit has been read. The clock sampling signal is supplied to the clock pit phase detector 13. In accordance with the clock sampling signal thus received, the clock pit phase detector 13 obtains, from the digital RF signal, the phase error signal which indicates the difference in the sample values before and after the clock pit waveform.

The reproduction clock pulses generated by the PLL circuit 16 are supplied to the frequency error generator 18, and the interval between the synchronous signals by counting the reproduction clock pulses from the PLL circuit 16 in response to the detection synchronous signal. The counted value of the clock pulses is compared with the second predetermined value, and the frequency control signal is generated in accordance with the result of the comparison.

The frequency control signal controls the frequency of the reproduction clock pulses generated from the PLL circuit 16. The frequency error generator 18 generates the first frequency lock signal when the frequency of the reproduction clock pulses enters the first predetermined range. In response to the first frequency lock signal, the change-over switch 19 relays and supplies the reproducing clock pulses output from the PLL circuit 16 to the A/D converter 12, edge interval/synchronization detector 15, and timing generator 17. Hence the clock pulse generator is no longer in the initial condition, and the A/D converter 12, edge interval/synchronization detector 15, timing generator 17 are operated in accordance with the reproduced clock pulses instead of the master clock pulses. In this way, the clock pulse generator shifts itself into the state of a frequency control loop.

The frequency of the reproduction clock pulses is controlled in accordance with the frequency control signal, and its accuracy becomes higher as more synchronizing signals are detected. When the frequency of the reproduction clock pulses enters the second predetermined range, the second frequency lock signal is generated. In response to the second frequency lock signal, the PLL circuit 16 controls the phase of the reproduction clock pulses in accordance with the phase error signal from the clock pit phase detector 13 in place of the frequency control signal. Thus, the clock pulse generator is in the state of a phase control loop.

As described above, according to the optical disk of the present invention, the synchronous marks are aligned on each of the tracks in the same radial direction of the disk and each have an edge interval longer than the maximum inversion interval of the marks, and the interval between the adjacent synchronous marks is made smaller than the spot diameter of the reading beam. Therefore, in the radial direction of the disk where the synchronous marks are present, the synchronous mark is included in the spot of the reading beam of the pickup irrespective of whether the beam is on-track or off-track, thus making it possible to obtain substantially the same level for the synchronous signals. As a result, it is easy to detect the synchronous signal from the RF signal after it is digitized by means of the A/D converter.

Hence, no detection system including a differentiator is necessary to detect the synchronous signal although such a system is required in the conventional art. Thus, there is no need for adjusting the operational timing between the systems to detect the synchronous signal and for the system to reproduce the data, advantageously.

What is claimed is:

1. An optical disk provided with a plurality of tracks, said disk having a recording format for a sampled servo system, and comprising a preformatted servo field including a synchronous mark for synchronization detection and a data field for recording data on each track;

wherein each synchronous mark is aligned in the same radial direction of the disk per track, and each said synchronous mark has an edge interval longer than a maximum inversion interval between other marks in the direction of the track; and an interval of said aligned synchronous marks between adjacent tracks is smaller than a spot diameter of a reading beam.

* * * * *